United States Patent
Mercer et al.

(10) Patent No.: US 7,681,921 B2
(45) Date of Patent: Mar. 23, 2010

(54) AUTOMOBILE IDENTIFICATION LABELING AND TRACKING SYSTEM

(75) Inventors: Merlin Mercer, Gailatin, TN (US); James P. Harman, Jr., Greenville, TN (US); Loyce W. Harman, legal representative, Greenville, TN (US); Mary Lillian Sisseck, Deerfield, MO (US); Lance J. Triplett, Deerfield, MO (US); Duane L. Zimmer, Swartz Creek, MI (US); Billy G. Cowan, Fort Scott, KS (US)

(73) Assignee: Ward-Kraft, Inc., Fort Scott, KS (US)

( * ) Notice: Subject to any disclaimer, the term of this patent is extended or adjusted under 35 U.S.C. 154(b) by 0 days.

(21) Appl. No.: 11/757,889

(22) Filed: Jun. 4, 2007

(65) Prior Publication Data
US 2007/0229236 A1    Oct. 4, 2007

Related U.S. Application Data

(62) Division of application No. 10/065,606, filed on Nov. 1, 2002.

(51) Int. Cl.
*B42D 15/00*  (2006.01)
*B32B 9/00*  (2006.01)
*B65D 65/28*  (2006.01)
*G09F 3/00*  (2006.01)

(52) U.S. Cl. ................... 283/56; 283/81; 283/94; 283/101; 283/105; 283/109; 283/117; 428/41.8; 428/42.2; 428/40.1; 428/43

(58) Field of Classification Search ............ 156/247, 156/249, 265, 277, 278, 289, 301; 283/81, 283/94, 98, 100, 101, 108; 428/40.1, 42.2, 428/42.3, 43, 194, 195.1, 202, 204, 207, 428/343, 354; 705/14; B32B 07/06, 07/12, B32B 09/00, 31/10, 31/12, 31/18; B42D 15/00; G06F 17/60

See application file for complete search history.

(56) References Cited

U.S. PATENT DOCUMENTS

| | | | | |
|---|---|---|---|---|
| 4,951,970 A | * | 8/1990 | Burt | 283/67 |
| 5,466,502 A | * | 11/1995 | Wilkinson et al. | 428/42.1 |
| 5,494,726 A | * | 2/1996 | Inomata | 428/131 |
| 6,019,865 A | * | 2/2000 | Palmer et al. | 156/265 |
| 6,352,608 B1 | * | 3/2002 | Garden | 156/249 |
| 2002/0143616 A1 | * | 10/2002 | Hajdukiewicz et al. | 705/14 |

* cited by examiner

*Primary Examiner*—Dana Ross
*Assistant Examiner*—Justin V Lewis
(74) *Attorney, Agent, or Firm*—Hovey Williams LLP

(57) ABSTRACT

A system, method, computer program, and business form that may be used to more quickly, accurately, and efficiently label, identify, track, and inventory new and previously-owned vehicles on an auto dealer's lot. Many aspects may also be used to track other objects such as hotel keys. The computer program and method include the steps of: receiving vehicle information for at least one vehicle to be delivered to the auto dealer; storing the vehicle information in a vehicle database accessible by the computer; receiving data obtained from the vehicle when the vehicle is delivered to the auto dealer; comparing the data to the vehicle database to determine if vehicle information has been received for the vehicle; and directing a printer to print at least a portion of the vehicle information on an identifier to be applied to the vehicle if the data corresponds to the vehicle information in the vehicle database.

21 Claims, 4 Drawing Sheets

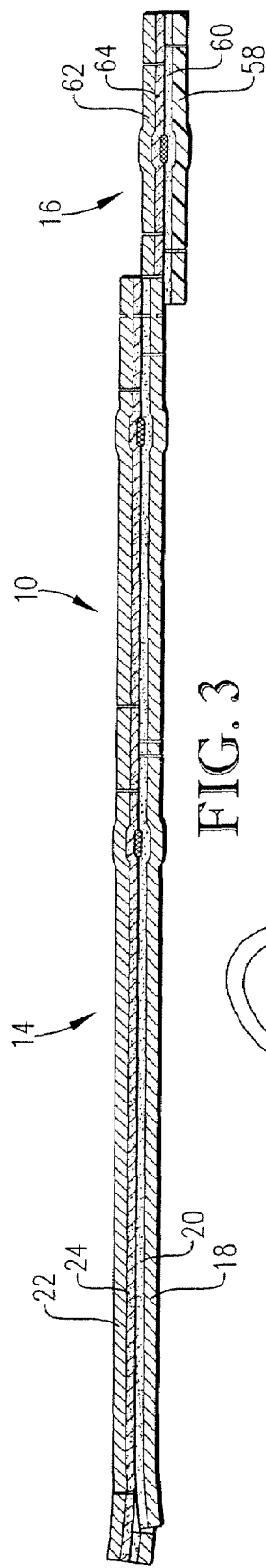
FIG. 3
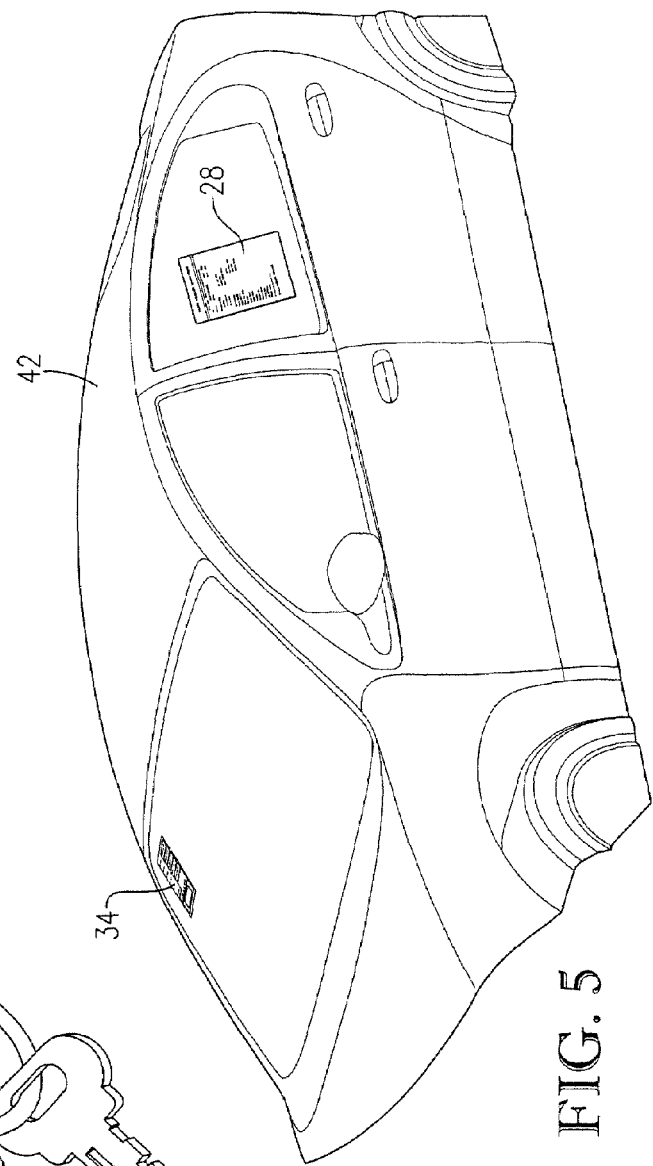
FIG. 4
FIG. 5

AUTOMOBILE IDENTIFICATION LABELING AND TRACKING SYSTEM

RELATED APPLICATION

This is a divisional of application Ser. No. 10/065,606 filed Nov. 1, 2002, which is hereby incorporated by reference herein.

BACKGROUND OF THE INVENTION

1. Field of the Invention

The present invention relates to vehicle identification methods. More particularly, the invention relates to a system, method, computer program, and business form that may be used to more quickly, accurately and efficiently label, identify, and track vehicles and other objects.

2. Description of the Prior Art

Auto dealers spend a considerable amount of time and money receiving, preparing, and inventorying new and used vehicles. Although these efforts are necessary, they distract dealers from focusing on revenue-generating activities such as selling the vehicles and servicing them after their sale.

Many auto dealers manage their inventory of vehicles using mostly manual methods. When a vehicle arrives on a dealer's lot, the dealer extracts information, such as the vehicle's identification number (VIN), from a manufacturer-provided window sticker adhered to the vehicle. The extracted information is then added to one or more lists containing vehicle information for all vehicles on the dealer's lot. The dealer then periodically inventories the vehicles on its lots by comparing the VINs on the window stickers to the vehicle lists to ensure that all vehicles on the lists are accounted for. Those skilled in the art will appreciate that these steps are time-consuming, costly, and not entirely accurate because employees sometimes read and/or write down the wrong VIN when adding a vehicle to inventory or while verifying the existence of vehicles already in inventory. Moreover, vehicles are often being test driven, serviced, or driven by employees and therefore absent or located in the wrong place during an inventorying procedure, resulting in incomplete or inaccurate inventory results.

The above-described problems are even more pronounced for previously-owned vehicles because such vehicles typically do not arrive on the dealer's lot with a window sticker containing information about the vehicle such as the VIN, make, model, price, etc. Because such information is needed to track and sell the vehicles, most dealers print and apply their own window stickers to previously-owned vehicles. To do so, the dealers must first obtain all necessary information to be printed on the window stickers, some of which, such as factory-installed options, dealer-installed options, price, warranties, etc., are not readily apparent from a quick inspection of the vehicle. Obtaining much of this information therefore currently requires both a thorough inspection of the vehicle and reference to a source of used vehicle prices and features, such as a Kelly Blue Book. The gathered information must then be manually entered into a computer so that it may be printed on a window sticker or hand-written directly on the window sticker. Because these steps require one or more persons to transfer several pieces of information from several difference sources, they are time-consuming, costly and prone to human error.

Another limitation of existing vehicle inventorying methods is the difficulty in identifying and tracking vehicle keys. Because auto dealers sometimes have hundreds of new and used vehicles on their lots, each having at least one set of keys, the identification, marking, and tracking of keys is critical to their operations. Most auto dealers attach keys to key tags on which identifying information is printed. For example, a key tag may list a vehicle's VIN, make, and model so that the keys may be easily associated with the proper vehicle. This information is typically obtained by a visual inspection of the vehicle when it arrives at the dealer's lot and is then printed on the key tags by hand. As with creating window stickers for used vehicles, these steps are time-consuming, costly and prone to human error. Moreover, the information hand-written on the key tags often becomes smudged and difficult to read as the keys are repeatedly handled by dealers and potential customers.

Another limitation of existing vehicle inventorying methods is that sales people often have difficulty locating a particular vehicle on a dealer's lot when they desire to show the vehicle to a prospective customer. As mentioned above, vehicles are frequently test driven, serviced, or driven by employees and therefore moved from place to place on a dealer's lot and elsewhere. Currently, no cost-effective method exists to track the current location of all vehicles on a dealer's lot.

SUMMARY OF THE INVENTION

The present invention solves the above-described limitations and provides a distinct advance in the art of vehicle identification methods. Particularly, the invention provides a system, method, computer program, and business form that may be used to more quickly, accurately, and efficiently label, identify, track, and inventory new and previously-owned vehicles on an auto dealer's lot. Many aspects of the present invention may also be used to track other objects such as hotel keys.

One aspect of the present invention includes a computer program and method operable to assist an auto dealer in identifying and labeling vehicles on its lot. The computer program and method broadly include the steps of: receiving vehicle information for at least one vehicle to be sold by the auto dealer; storing the vehicle information in a vehicle database accessible by the computer; receiving data obtained from the vehicle when the vehicle is delivered to the auto dealer; comparing the data to the vehicle database to determine if vehicle information has been received for the vehicle; and directing a printer to print at least a portion of the vehicle information on an identifier to be applied to the vehicle if the data corresponds to the vehicle information in the vehicle database.

In preferred forms, the identifier is created by the dealer from a merged-web business form. The business form includes a first web portion including a removable window sticker on which vehicle information relating to the vehicle may be printed and that may be adhered to a window of the vehicle; and a second web portion merged with the first web portion and including a removable key tag label on which vehicle information relating to the vehicle may be printed and that may be attached to a key of the vehicle. An RFID tag encoded with vehicle-specific information may be attached to or embedded in both the window sticker and key tag label for identification and tracking purposes.

Another aspect of the present invention includes a method for inventorying and tracking vehicles offered for sale by an auto dealer. The method broadly includes the steps of: maintaining in a computer a vehicle database containing vehicle information for at least one vehicle offered for sale by the auto dealer; printing at least a portion of the vehicle information on a sticker; adhering the sticker to the vehicle; periodically reading data from the sticker with a handheld scanning device; transmitting the data from the handheld scanning device to the computer; and comparing the data to the vehicle database to inventory and track the location of the vehicle. The data read from the sticker is preferably encoded in an RFID tag attached to or embedded in the sticker or read from a bar code printed on the sticker.

Another aspect of the present invention provides a self-sealing business form that may be used to quickly and easily create a water-resistant key tag label that may be attached to a set of vehicle keys. The key tag label resists smudging so that information printed thereon is completely readable, regardless of the number of times the keys and key tag label are handled by dealers and potential customers. The self-sealing business form broadly comprises: a backing layer formed of water-resistant material and having a front surface and a rear surface; a layer of adhesive deposited on the front surface of the backing layer; and a label having a front surface on which information may be printed and a rear surface adhered to a portion of the front surface of the backing layer by the adhesive. The label is sized so that a portion of the front surface of the backing layer may be folded over the front surface of the label to substantially seal the label within the backing layer.

These and other important aspects of the present invention are described more fully in the detailed description below.

BRIEF DESCRIPTION OF THE DRAWING FIGURES

A preferred embodiment of the present invention is described in detail below with reference to the attached drawing figures, wherein:

FIG. 3 is a sectional view of the business form taken along lines 3-3 of FIG. 1.

FIG. 4 is a sectional view of a key tag portion of the business form shown attached to a key of a vehicle.

FIG. 5 is a fragmentary view of a vehicle showing several labels or stickers taken from the business form of FIG. 1 and adhered to the vehicle.

Figure 1:
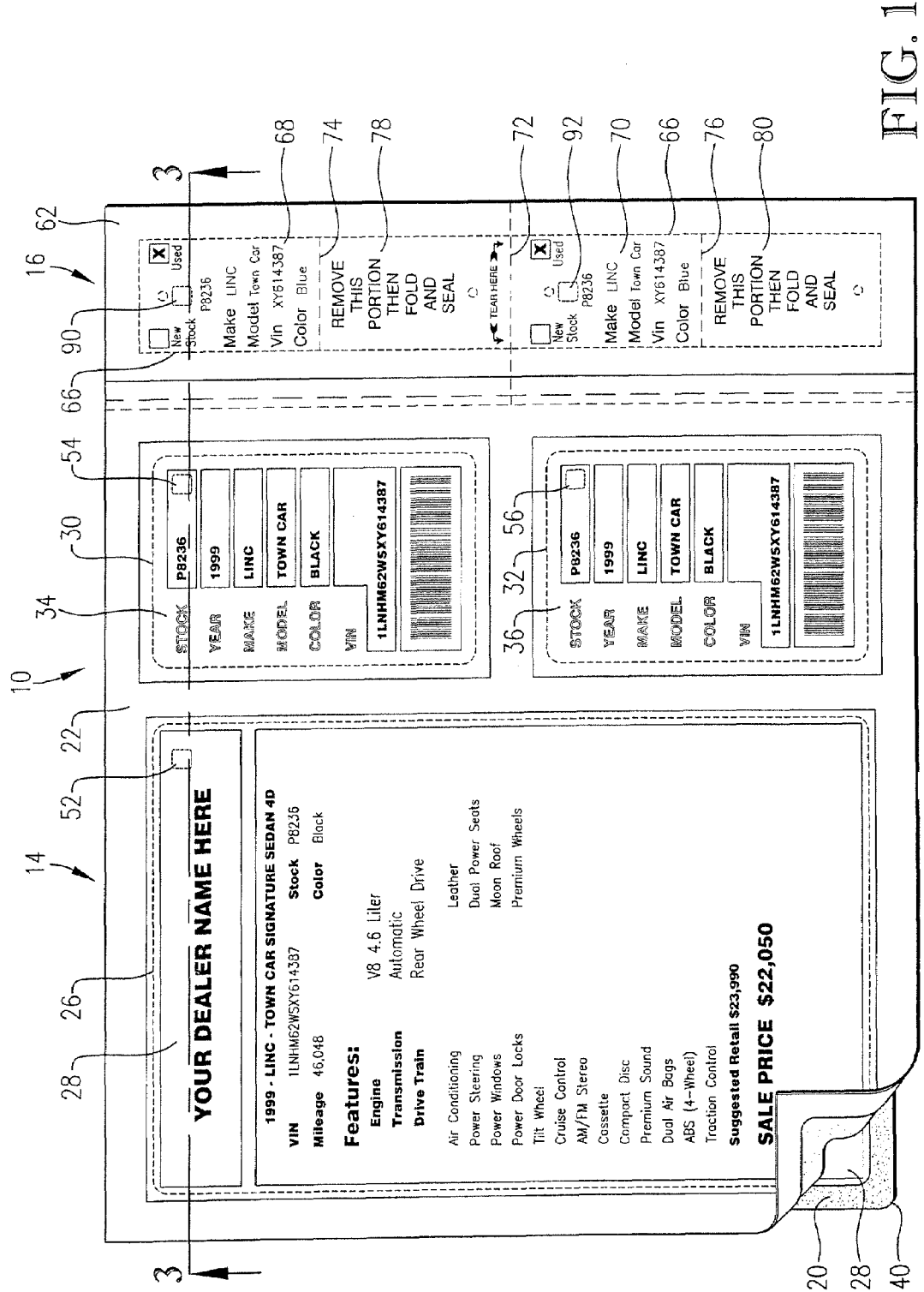
FIG. 1 is a front elevational view of a business form that may be used to implement certain aspects of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE PREFERRED EMBODIMENTS

Figure 6:
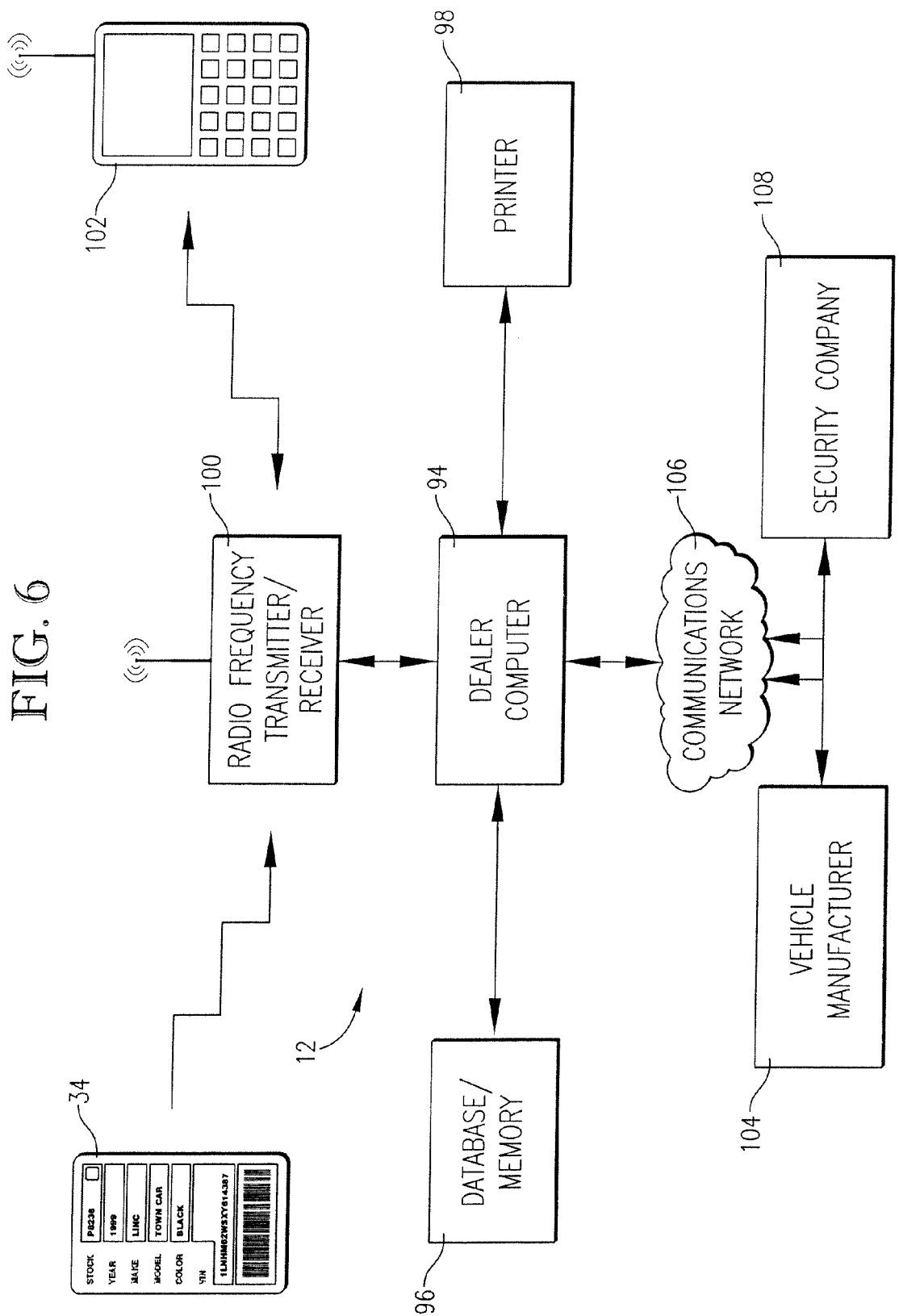
FIG. 6 is a block diagram depicting several computer equipment components that may be used to implement a vehicle labeling, identifying, tracking and inventorying method of the present invention.

The present invention is preferably implemented with a business form 10 illustrated in FIGS. 1-5, and a computer program that operates computer equipment broadly referred to by the numeral 12 in FIG. 6. The present invention is particularly adapted to label, identify, track, and inventory vehicles on an auto dealer's lot, but may also be used to label and track other objects such as hotel keys maintained by a hotel or keys maintained by a security company. For purposes of describing a preferred embodiment of the present invention, however, the business form 10 and computer equipment 12 will be described herein as being specifically adapted for use with vehicles on an auto dealer's lot.

The business form 10 is provided to assist an auto dealership in labeling and identifying a vehicle on its lot. The dealership is preferably provided with a plurality of blank business forms 10 on which vehicle-specific information may be printed for all the vehicles on its lot as described in more detail below.

The business form 10 may be colored to more readily identify a particular type or brand of vehicle. For example, a dealer may have a stock of blank blue business forms to identify vehicles manufactured by Chevrolet and a stock of blank green business forms to identify vehicles manufactured by Ford. Similarly, business forms of one color may be used to identify trucks whereas business forms of another color may be used to identify automobiles.

The size and shape of the business forms 10 may be selected as a matter of design choice. In one embodiment, each business form 10 is generally rectangular in shape as illustrated in FIG. 1 and is approximately 8½ inches wide and 11 inches long. The particular size and format of the business form 10, as well as the information printed thereon, may vary depending on whether the vehicle to be identified is new or previously-owned. For example, the business form illustrated in FIG. 1 is preferably configured for a previously-owned vehicle and includes a relatively large window sticker (approx. 5"×7½") on which all of the manufacturer and dealer-supplied options for the vehicle may be printed. A similar business form (not illustrated) may be used for new vehicles, but may include a smaller window sticker, because much of the vehicle information will be supplied on the manufacturer-provided window sticker.

Figure 2:
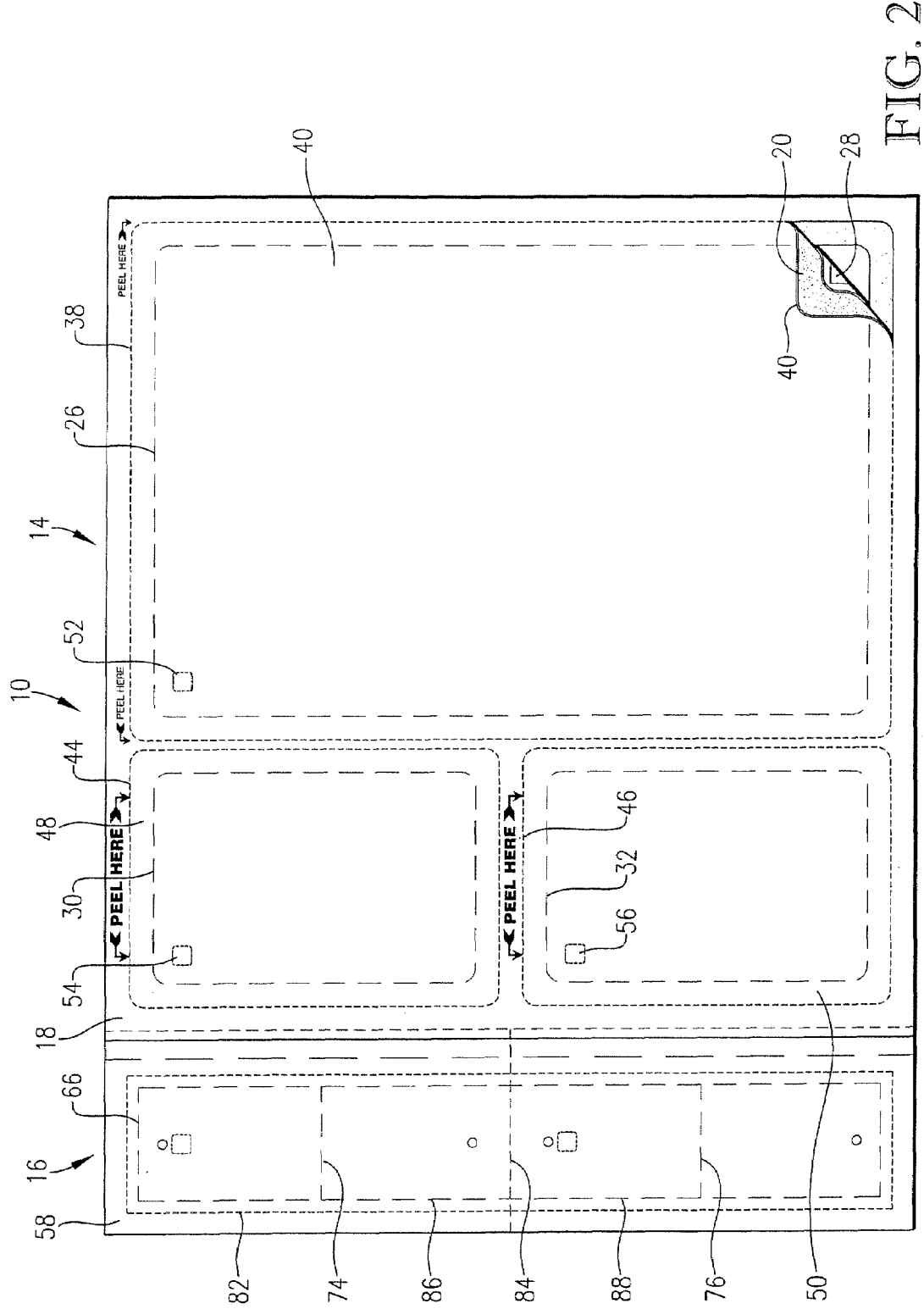
FIG. 2 is a rear elevational view of the business form of FIG. 1.

Referring to FIGS. 1-3, each business form 10 is preferably a merged web consisting of a first web portion 14 and a second web portion 16 merged or attached to the first web portion 14. By merging the first and second web portions together, a dealer may label and identify each vehicle on its lot with a single business form 10 containing multiple labels or stickers made of dissimilar material.

As best illustrated in FIG. 3, the first web portion 14 includes a backing layer 18 having a layer of adhesive 20 formed on its upper surface. A printable layer 22 is then adhered to the upper surface of the backing layer 18 by the adhesive 20. A coating of release agent 24 such as a silicone material is preferably applied to the lower surface of the printable layer 22 so that the printable layer 22 can be easily removed from the backing layer 18.

The backing layer 18 may be formed from any suitable material on which adhesive may be deposited. For example, the backing layer 18 may be formed from a roll of pressure-sensitive adhesive label stock cut to a desired shape and size of the business form 10. The printable layer 22 may be formed from any conventional material capable of receiving print from a standard printer. For example, the printable layer 22 may be formed from paper label stock cut to the desired shape and size.

Referring again to FIG. 1, the upper surface of the printable layer 22 is preferably die cut to form a perforation or line of weakness 26 that defines a removable window sticker 28 on which vehicle specific information may be printed. The printable layer 22 is similarly die cut to form two perforations or lines of weakness 30, 32 that each define a removable stock label 34, 36 on which vehicle information may be printed. The information printed on the window sticker 28 and stock labels 34, 36 is described in more detail below.

As best illustrated in FIG. 2, the lower surface of the backing layer 18 is also die cut to form a perforation or line of weakness 38 that defines a removable sticker backing 40 slightly larger than and substantially covered by the window sticker 28. The perforation 38 permits the sticker backing 40 and the window sticker 28 carried on the backing 40 to be removed from the rear of the business form 10. When so removed, the periphery of the removed sticker backing 40 extends beyond the periphery of the window sticker 28 so that a border of the adhesive 20 on the upper surface of the backing layer 18 is exposed as depicted in FIGS. 1 and 2. This permits the window sticker 28 and sticker backing 40 to be adhered to the inside surface of a windshield and/or windows of a vehicle 42 and read from the exterior of the vehicle as depicted in FIG. 5.

Similarly, the lower surface of the backing layer 18 is die cut to form two perforations or lines of weakness 44, 46 that each define a removable label backing 48, 50 slightly larger than and substantially covered by one of the stock labels 34, 36. The perforations 44, 46 permit the label backings 48, 50 and the stock labels 34, 36 to be removed from the rear of the business form 10. When so removed, the periphery of the label backings 48, 50 extend beyond the periphery of the stock labels 34, 36 so that a border of the adhesive on the upper surface of the backing layer is exposed. This permits the stock labels and label backings to be adhered to the inside of a vehicle while being readable from the exterior of the vehicle as depicted in FIG. 5.

As best illustrated in FIGS. 1 and 3, the first web portion 14 also includes three RFID tags 52, 54, 56: one 52 positioned between the window sticker 28 and its sticker backing 40; one 54 positioned between the stock label 34 and its label backing 48; and one 56 positioned between the stock label 36 and its label backing 50. The RFID tags 52, 54, 56 are preferably integrated circuits with a memory storage of at least one byte and read-only or read/write capabilities. Each integrated circuit includes an RF transmitter and a receiver (in the case of read/write capabilities) and memory. Data stored within the memory of the integrated circuit can be interrogated by a reader. Alternatively, the reader may provide for reading and/or storing information into a read/write transponder memory. The RFID tags 52, 54, 56 may also be of a chip-less type and contain a series of resonant circuits operating at different frequencies with each resonant circuit enabled or disabled corresponding to a unique binary number. The RFID tags 52, 54, 56 may be powered by batteries or may be passive devices without batteries. The purpose of the RFID tags 52, 54, 56 is described in more detail below.

Returning to FIG. 3, the second web portion 16 includes a backing layer 58 having a layer of adhesive 60 on its upper surface. The upper surface of the leftmost end of the backing layer 58 (as viewed in FIG. 3) is merged with or attached to the lower surface of the rightmost end of the backing layer 18 of the first web portion 14 to form a merged web. The second web portion 16 also includes a printable layer 62 adhered to the upper surface of the backing layer 58 by the adhesive 60. As with the first web portion 14, the printable layer 62 preferably includes a release agent 64 sprayed on its lower surface so that it may be more easily removed from the backing layer 58.

The backing layer 58 is preferably formed of water-resistant poly film material cut to the desired shape and size. The printable layer 62 is preferably formed of conventional paper label stock material cut to the desired shape and size.

Referring to FIG. 1, the upper surface of the printable layer 62 is die cut to form a continuous perforation or line of weakness 66 that defines two removable key tag labels 68, 70 on which vehicle specific information may be printed. An additional perforation or line of weakness 72 formed in the approximate center of each key tag label 68, 70 defines a waste portion 78, 80 that may be removed and discarded as described in more detail below.

As best illustrated in FIG. 2, the lower surface of the backing layer 58 is also die cut to form a continuous perforation or line of weakness 82 and a perforation or line of weakness 84 that together define two label backings 86, 88 slightly larger than and substantially covered by the key tag labels 68, 70. The perforations 82, 84 permit the label backings 86, 88 and the labels 68, 70 to be removed from the rear of the business form 10. When so removed, the peripheries of the removed label backings 86, 88 extend beyond the peripheries of the key tag labels 68, 70 so that a border of the adhesive of the upper surface of the backing layer 58 portions is exposed.

An RFID tag 90, 92 is preferably positioned between each of the key tag labels 68, 70 and their respective label backings 86, 88. The RFID tags 90, 92 are identical to the RFID tags 52, 54, 56 described above.

Referring now to FIG. 6, the computer equipment 12 used to implement the methods of the present invention broadly includes a computer 94 programmed as described herein, memory 96 accessible by the computer 94, a printer 98, a radio frequency transmitter/receiver 100, and a handheld computing device 102. The computer program and equipment 12 illustrated and described herein are merely examples of a program and equipment that may be used to implement the present invention and may be replaced with other software and computer equipment without departing from the scope of the present invention.

The computer 94 is operated by the auto dealer and executes the computer program described herein. The computer 94 may be any computing device such as a personal computer or network server. The computer 94 may be connected to other computing devices such as a firewall to prevent tampering with information stored on or accessible by the computer 94. The computer 94 may include conventional web hosting operating software, an Internet connection such as a modem, DSL converter or ISDN converter, and may be assigned a URL and corresponding domain name so that it can communicate and be accessed via the Internet in a conventional manner.

The memory 96 is either resident in or accessible by the computer 94 and serves as a repository for data and programs used to implement certain aspects of the present invention as described in more detail below.

The computer 94 preferably receives vehicle information from the computing system 104 of at least car manufacturers and therefore is capable of communicating with the computing system 104 via a communications network 106. Similarly, the computer 94 may communicate with a computer system 108 of a security company via the communications network 106 so that the computer 94 may send security alerts to the security company. The communications network 106 is preferably the Internet but may be any other conventional communications network such as a local area network, a wide area network, a wireless network, or an intranet.

The computer program of the present invention is stored in or on computer-readable medium residing on or accessible by the computer 94 such as the memory 96. The computer program preferably comprises an ordered listing of executable instructions for implementing logical functions in the computer 94 or the equipment coupled with the computer 94. The computer program can be embodied in any computer-readable medium for use by or in connection with an instruction execution system, apparatus, or device, such as a computer-based system, processor-containing system, or other system that can fetch the instructions from the instruction execution system, apparatus, or device, and execute the instructions. In the context of this application, a "computer-readable medium" can be any means that can contain, store, communicate, propagate or transport the program for use by or in connection with the instruction execution system, apparatus, or device. The computer-readable medium can be, for example, but not limited to, an electronic, magnetic, optical, electro-magnetic, infrared, or semi-conductor system, apparatus, device, or propagation medium. More specific, although not inclusive, examples of the computer-readable medium would include the following: an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM). The computer-readable medium could even be paper or another suitable medium upon which the program is printed, as the program can be electronically captured, via for instance, optical scanning of the paper or other medium, then compiled, interpreted, or otherwise processed in a suitable manner, if necessary, and then stored in a computer memory.

The printer 98 is coupled with the computer 94 and is provided for printing vehicle information on the business forms 10 as described in more detail below. The printer 98 may be any conventional printer such as a laser printer or ink jet printer.

The transmitter/receiver 100 is coupled with the computer 94 and is operable for wirelessly communicating with the handheld computing device 102. The transmitter/receiver 100 is preferably a radio frequency transmitter/receiver that can read data from the RFID tags 52, 54, 56, 90, 92 described above. The transmitter/receiver 100 may do so by interrogating the RFID tags 52, 54, 56, 90, 92 if the tags are passive devices (without a battery) or may receive information actively transmitted by the RFID tags 52, 54, 56, 90, 92 if the tags are battery powered. In preferred forms, a number of transmitters/receivers are positioned at strategic locations of an auto dealer's lot so that the RFID tags 52, 54, 56, 90, 92 on all of the vehicles can be read, regardless of where the vehicles are located on the lot.

The handheld computing device 102 is preferably a pocket PC containing a bar code scanner/reader and an RFID tag reader. The handheld computer 102 is also preferably equipped with a radio frequency transmitter/receiver so that it may wirelessly communicate with the transmitter/receiver 100 coupled with the computer 94. In preferred forms, a number of handheld computers 102 are provided so that they may be used by various personnel of an auto dealer, including sales people, stock managers, etc.

In accordance with one aspect of the present invention, the business form 10 and computer equipment 12 described above can be used to assist an auto dealer in labeling, identifying, tracking and inventorying vehicles offered for sale on the auto dealer's lot. To begin this process, the computer 94 first receives vehicle information for a vehicle. For a new vehicle, the vehicle information is preferably sent electronically to the computer 94 from the vehicle manufacturer 104 via the communications network 106 before the vehicle is delivered. The vehicle information preferably includes all the information typically provided on the auto manufacturer's factory invoice, including the vehicle's VIN, factory-installed options, stock number, make, model, color, gas mileage rating, and estimated date of arrival.

For a previously-owned vehicle, the vehicle information may be obtained from a combination of sources. Much of the vehicle information is preferably obtained from a source of used vehicle information such as the Kar Power software package available from Kelly Automotive. This software includes a database containing information relating to all years, models, and makes of vehicles cross-referenced to the vehicles' VINs. When a previously-owned vehicle is received at the dealer's lot, the vehicle's VIN number is scanned from a bar code on the vehicle with the handheld computing device 102 and then transmitted to the computer 94. If the vehicle does not have a VIN bar code, the VIN may be manually read and typed into the handheld computing device 102. The computer 94 then accesses the used vehicle database and obtains all information cross-referenced to the scanned VIN. Information not contained in the used vehicle database, such as dealer-provided options and the mileage on the vehicle may be obtained by a quick inspection of the vehicle and entered by hand into the handheld computing device 102 and transmitted to the computer 94.

The computer 94 then stores the vehicle information received from the car manufacturer (for a new vehicle) or obtained from the used vehicle database and inspection (for a previously-owned vehicle) in a vehicle database residing on the memory 96. Once populated, the vehicle database contains vehicle information for all vehicles received or soon to be received on the dealer's lot.

The next step in the process is to identify and label vehicles so that they may be easily tracked and inventoried. For a new vehicle, the bar code printed on the manufacturer-provided window sticker is scanned with the handheld computer 102 when the vehicle actually arrives at the dealership. Identifying data for the vehicle, such as the vehicle's VIN, is transmitted wirelessly from the handheld computer 102 to the transmitter/receiver 100 and then transferred to the computer 94. The computer 94 compares the scanned data to the vehicle database in the memory 96 to determine if vehicle information has been received from the vehicle manufacturer. If it has, the computer 94 extracts information from the vehicle information database and prints the information on one or more indicators to be adhered to the vehicle. In preferred forms, the indicators include the window sticker 28, stock labels 34, 36, and key ring tags 68, 70 described above. For a new vehicle, the vehicle information printed on the window sticker preferably includes a stock number, the vehicle's VIN, the make and model of the vehicle, and a list of all dealer-added options. The dealer's name, address, phone number, and gas mileage information may also be printed on the window sticker.

For a previously-owned vehicle, the vehicle's VIN is scanned from a bar code on the vehicle or manually read if no VIN bar code exists. The scanned or manually-read data is then transmitted wirelessly from the handheld computer 102 to the transmitter/receiver 100 and then transferred to the computer 94. The computer 94 then accesses the used vehicle database in memory 96 and obtains information cross-referenced to the vehicle's VIN and transmits this vehicle information to the handheld computing device 102 so that the operator may verify the information. The operator may also manually enter information not contained in the used vehicle database such as after-market options, the mileage on the vehicle, and the general condition of the vehicle. This information is added to the information obtained from the used vehicle database and transmitted back to the computer 94 so that it may be added to the vehicle database. The computer 94 then extracts some of the vehicle information from the vehicle database and prints the information on a window sticker 28, stock labels 34, 36, and key ring labels 68, 70 as described above. The information printed on the window sticker 28 is the same as the information described above with reference to a new vehicle but also includes additional information such as a list of after-market options, the vehicle's Kelly Blue Book value, sale price, and mileage because such information is not provided in a manufacturer-provided window sticker.

The vehicle information printed on the stock labels is the same for both new and used vehicles. Such information preferably includes a stock number, the year, make, model and color of the vehicle, the vehicle's VIN, and a bar code label representative of the vehicle's VIN and possibly other information. The vehicle information printed on the key tag labels 68, 70 is also the same for both new and used vehicles. Such information preferably includes a stock number, the year, make, model, VIN, and color of the vehicle, and an indication of whether the vehicle is new or previously-owned.

The blank business forms 10 may also include preprinted information generic to all vehicles such as headings introducing vehicle-specific information. The headings may include, for example, "STOCK", "YEAR", "MAKE", "MODEL", "COLOR", and "VIN".

Some of the vehicle information may also be encoded and stored into the RFID tags 52, 54, 56, 90, 92 embedded in the window sticker, stock labels, and key tag labels. For example, the vehicle's VIN and stock number may be encoded in the RFID tags 52, 54, 56, 90, 92 so that such information may be wirelessly transmitted to the transmitter/receiver during an inventorying process as described below.

The window sticker 28 and stock labels 34, 36 as well as their backings are then removed from the business form 10 and adhered to the windshield and/or windows of the vehicle as depicted in FIG. 5. The key tag labels 68, 70 and their backings are removed from the business form 10 and then assembled into water-resistant key ring labels for attachment to the vehicle's keys as depicted in FIG. 4. Specifically, the key ring labels 68, 70 and their backings are removed from the business form 10 and the waste portions 78, 80 are removed and discarded. The lower portion of each backing is then folded over its key ring label so as to substantially seal the key ring label in the water-resistant film of the backing. This seals the printing on the key ring labels from moisture and prevents smudging so that the key ring labels can be read, regardless of how many times they are handled by dealers, potential customers, and others.

Once the above-described identifiers have been printed and adhered to all of the vehicles on a dealer's lot and the vehicles' keys, they may be used to assist the dealer in inventorying the vehicles. For example, the vehicle database, which lists all vehicles on the dealer's lot, may be copied from the memory 96 to the computer 94 and then downloaded to the handheld computing device 102. An operator may then scan the bar code on the stock label adhered to each vehicle so that the scanned data may be compared to the vehicle database. When the operator has scanned the bar code on every vehicle, the handheld computer 102 determines whether every vehicle in the vehicle database is accounted for on the dealer's lot.

Alternatively, the handheld computing device 102 may wirelessly transmit the scanned information from the bar codes to the computer 04 so that it may compare the scanned information to the information in the vehicle database. Or, the data encoded in the RFID tags 52, 54, 56, 90, 92 may be interrogated and/or actively transmitted to the transmitter receiver so that the compute may compare the data to the vehicle database. The computer 94 then generates and prints a report showing all the discrepancies between the vehicle database and the actual inventory on the dealer's lot. This permits the dealer to determine which cars are missing, if any, and to either locate these vehicles or alter the records in the vehicle database to indicate that a vehicle has been sold or otherwise transferred off the dealer's lot.

The RFID tags 52, 54, 56, 90, 92 in the window stickers 28, stock labels 34, 36, and key ring labels 68, 70 may also be used to track the approximate location of vehicles and keys on the dealer's lot. Specifically, the RFID tags 52, 54, 56, 90, 92 may be periodically interrogated (if passive) by the nearest transmitter/receiver 100 or may periodically actively transmit their encoded information (if active) to the nearest transmitter/receiver 100 so that the computer 94 knows which transmitter/receiver 100 the vehicle and/or the keys is closest to. Alternatively, each vehicle, and possibly even the vehicle keys, could be equipped with a GPS receiver that communicates with the RFID tags 52, 54, 56, 90, 92 to provide more exact location information to the computer 94.

Although the invention has been described with reference to the preferred embodiment illustrated in the attached drawing figures, it is noted that equivalents may be employed and substitutions made herein without departing from the scope of the invention as recited in the claims. For example, although the methods of the present invention are particularly useful for labeling, identifying, tracking, and inventorying vehicles on an auto dealer's lot, they may also be used to perform the same functions for other objects such as hotel keys.

Having thus described the preferred embodiment of the invention, what is claimed as new and desired to be protected by Letters Patent includes the following:

1. A business form for use by an auto dealer to identify a vehicle, the business form comprising:
   a first web portion having a laminate structure including a first printable layer and a first backing layer adhered together by a first adhesive,
   said first printable layer including a removable window sticker face on which vehicle information relating to the vehicle may be printed and that may be adhered to a window of the vehicle,
   said first printable layer including at least one first front-side die cut that projects therethrough but does not extend through the first backing layer,
   said first backing layer including at least one first back-side die cut that projects therethrough but does not extend through the first printable layer,
   said first die cuts being laterally offset from one another,
   said first front-side die cut defining an outer periphery of the window sticker face,
   said first backing layer being substantially opaque; and
   a second web portion having a laminate structure including a second printable layer and a second backing layer adhered together by a second adhesive,
   said second printable layer including a removable key tag label on which vehicle information relating to the vehicle may be printed and that may be attached to a key of the vehicle,
   said second backing layer being substantially transparent,
   said first and second printable layers presenting adjacent edges extending alongside one another in a non-overlapping relationship,
   said second backing layer and second adhesive projecting beyond the edge of the second printable layer, such that the second backing layer and second adhesive underlie the first backing layer and adhere thereto to form a merged web.

2. The business form as set forth in claim 1, the first printable layer further including a removable stock label sticker on which information relating to the vehicle may be printed and that may be placed on a windshield of the vehicle.

3. The business form as set forth in claim 2, the business form further including an RFID tag coupled with the window sticker, an RFID tag coupled with the key tag label, and an RFID tag coupled with the stock label sticker.

4. The business form as set forth in claim 1, wherein the second printable layer includes a plurality of key tag labels.

5. The business form as set forth in claim 2, wherein the first printable layer includes a plurality of stock label stickers.

6. The business form as set forth in claim 1, the vehicle information including a vehicle identification number (VIN) for the vehicle.

7. The business form as set forth in claim 6, the vehicle information further including a cost for the vehicle, a list of all options installed on the vehicle, and a description of all warranties for the vehicle.

8. The business form as set forth in claim 1, wherein the vehicle is a new vehicle and the vehicle information is received electronically from a manufacturer of the vehicle.

9. The business form as set forth in claim 1, wherein the vehicle is a previously-owned vehicle and the vehicle information is obtained from a source of used vehicle information.

10. The business form as set forth in claim 1, wherein the key tag label presents a front surface on which the vehicle information may be printed and a rear surface adhered to a portion of the second backing layer, with the key tag label being sized so that a portion of the second backing layer not covered by the key tag label may be folded over the key tag label to substantially seal the key tag label within the second backing layer.

11. The business form as set forth in claim 10, the second printable layer including a removable waste layer adhered to the portion of the second backing layer not covered by the key tag label, wherein the waste layer may be removed to expose the second adhesive on the portion of the second backing layer not covered by the key tag label so that the second backing layer may be folded over and adhered to the front surface of the key tag label.

12. The business form as set forth in claim 11, wherein the waste layer consists essentially of a single waste portion.

13. The business form as set forth in claim 12, wherein the single waste portion presents the same size and shape as the key tag label.

14. The business form as set forth in claim 10, the second web portion further including a hole formed in the key tag label and a pair of holes formed in the second backing layer that are aligned with the hole formed in the key tag label when the second backing layer is folded over the key tag label, with the aligned holes being operable to receive a key ring.

15. The business form as set forth in claim 1, wherein the first backing layer is formed of paper label stock.

16. The business form as set forth in claim 1, wherein the second backing layer is formed of poly film material.

17. The business form as set forth in claim 1, the first back-side die cut being disposed outboard of the first front-side die cut such that the first die cuts cooperatively form a first border of the first backing layer around the outer periphery of the window sticker face.

18. The business form as set forth in claim 17, the first die cuts corresponding to one another in shape such that the first border presents a substantially constant width dimension around the outer periphery of the window sticker face.

19. The business form as set forth in claim 1, wherein the second printable layer includes at least one second front-side die cut that projects therethrough but does not extend through the second backing layer and the second backing layer includes at least one second back-side die cut that projects therethrough but does not extend through the second printable layer, with at least portions of the second die cuts being laterally offset from one another, and with the second front-side die cut defining an outer periphery of the key tag label.

20. The business form as set forth in claim 19, at least a portion of the second back-side die cut being disposed outboard of the second front-side die cut such that the second die cuts cooperatively form a second border of the second backing layer around at least a part of the outer periphery of the key tag label.

21. The business form as set forth in claim 20, the second die cuts corresponding to one another in shape such that the second border presents a substantially constant width dimension around at least part of the outer periphery of the key tag label.

* * * * *